United States Patent Office 3,074,927
Patented Jan. 22, 1963

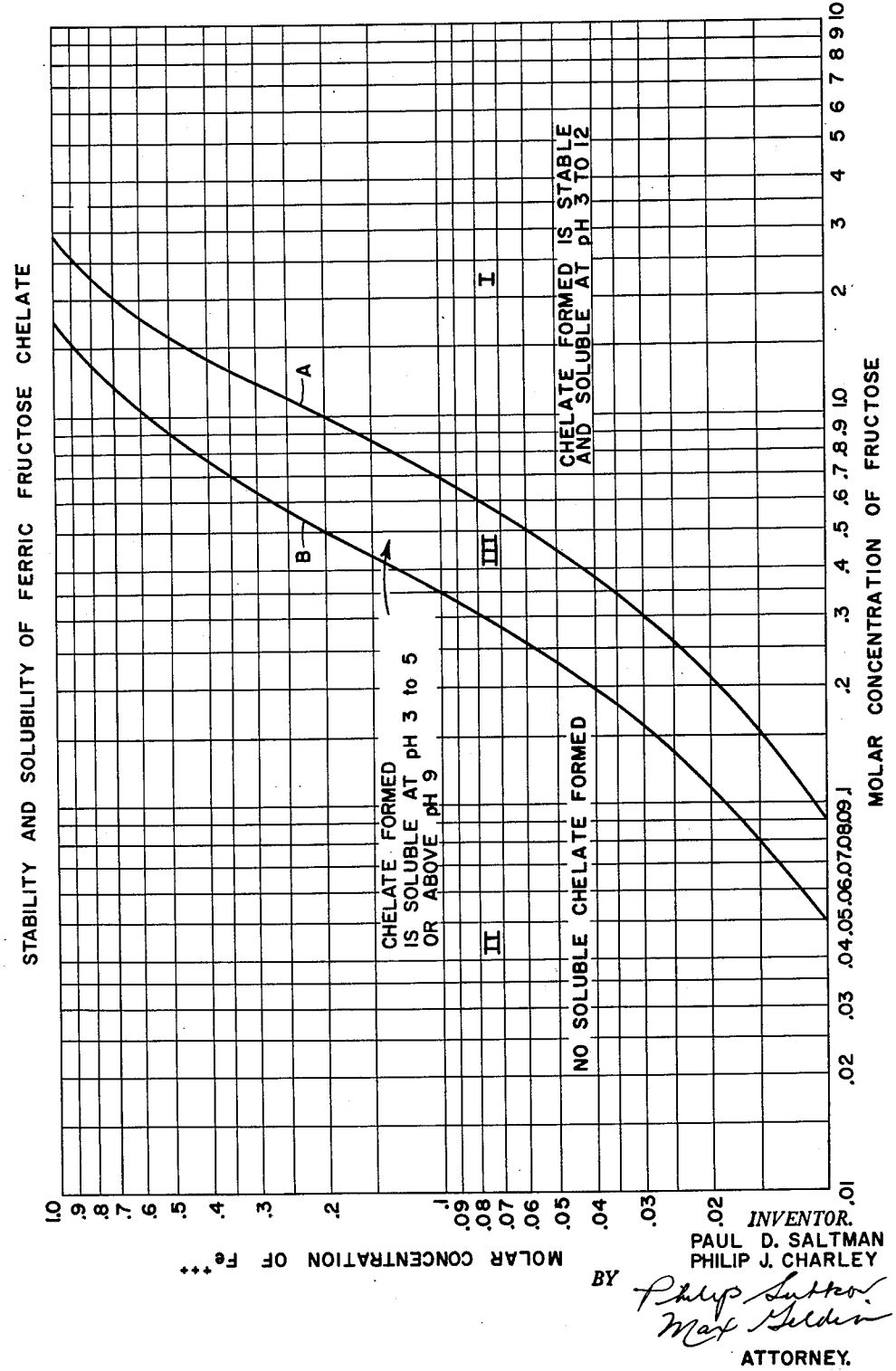

3,074,927
METALLIC COMPLEXES OF REDUCING SUGARS
Paul D. Saltman, 416 S. Michigan Ave., Pasadena, Calif., and Philip J. Charley, 1365 Ardenes Drive, Glendale 8, Calif.
Filed Apr. 12, 1960, Ser. No. 21,789
15 Claims. (Cl. 260—209)

This invention relates to a novel class of metallic complexes, and is particularly concerned with complexes of certain metals and reducing sugars.

It is well known that a number of polyvalent metallic ions such as iron will form complexes with polyhydroxy compounds such as polyhydric alcohols. However, on any substantial change in pH, the shift in equilibrium may cause the complex to decompose and the metallic ion in the presence of hydroxyl ion may tend to form a precipitate. This materially reduces the usefulness of these complexes for sequestering metallic ions, or for holding them in useful form in solution, particularly over varying pH ranges.

It is an object of this invention to provide novel compositions composed of a class of metallic complexes or chelates which are non-toxic, stable, and soluble, preferably over a wide pH range, and which have a variety of important uses.

Another object is the provision of soluble and stable complexes or chelates of certain metals with a particular group of sugars.

A still further object is to provide metal chelates of a specific class of metals with reducing sugars, which are soluble and stable over a broad pH range.

Yet another object is the provision of a process for preparing the aforementioned complexes or chelates.

We have surprisingly found that novel compositions composed of a metallic complex of a ligand and a metal of the group consisting of the alkaline earth metals calcium, magnesium, strontium and barium, and elements 22 through 30, inclusive, of the periodic table, where the ligand is a reducing sugar, which complex is non-toxic and may be soluble and stable over a wide pH range, e.g. about 3 to 12, are effective for a variety of important uses. These uses include the prevention of precipitates of metals such as iron in alkaline solutions, the sequestration of certain metals such as iron, chromium or nickel, from solutions such as plating solutions, and from other commercial solutions, removal of rust and stain in cleaning boiler components, as an additive in cleaning and washing compositions, and as a plant nutrient for supplying deficiencies of metals such as iron to plants.

The complexes of the invention are believed to be in the form of chelates of a metal of the group consisting of the alkaline earth elements calcium, magnesium, strontium and barium, and elements 22 to 30, namely, titanium, vanadium, chromium, manganese, iron, cobalt, nickel, copper and zinc, with the reducing sugar. The complex composition has an average molecular ratio of the sugar to the metallic constituent, e.g., iron, of at least 2:1. Such complex composition may include a minor portion of chelate having a molecular ratio of the reducing sugar to the metal which is less than 2:1, but the major portion of the chelate present in our composition has a molecular ratio of at least 2:1. The complexes or chelates of the invention can be obtained in the form of an alkali metal salt, e.g. sodium or potassium, or ammonium salt, depending on the particular alkali employed as an alkalizing medium during formation of the chelates. The preferred form of the chelates employed in the invention are those which are soluble and stable over the wide range of pH of about 3 to 12. However, complexes or chelates according to the invention, which may tend to precipitate in a pH range of about 5 to 9, but which can be redissolved at a lower or higher pH may also be utilized to advantage for many purposes.

It has been found that to obtain formation of the complexes or chelates hereof, aqueous solutions of the reducing sugar and of a soluble metallic salt are employed, including a substantial molar excess of the sugar to the metallic constituent of said salt. Thus the aqueous solution of the complex produced in the reaction generally contains a substantial molar excess of the sugar to the metallic constituent of the complex, as described more fully below.

The aqueous alkaline solution of the complex can be dried to obtain a solid composition comprising an alkali metal or ammonium salt of the complex having substantially the same molar ratio of reducing sugar to metal as present in the aqueous solution. Alternatively, the aqueous solutions of the complex can be treated with precipitating agents such as alcohol to precipitate the complex, e.g. from alcohol, forming the solid alkali metal or ammonium salt of the complex. As will be noted below, such precipitate may contain a smaller molar proportion of reducing sugar to the metallic constituent than the molar ratios of such sugar to the metal present in the aqueous solution of the complex.

According to the invention, the novel complexes or chelates are produced by reacting in aqueous solution a soluble compound or compounds of any one or more of the metals calcium, magnesium, strontium or barium, titanium, vanadium, chromium, manganese, iron, cobalt, nickel, copper or zinc, with a reducing sugar of the type described more fully below, the reaction taking place at about room temperature. For this purpose an aqueous solution of such soluble metal-containing compound can be mixed with an aqueous solution of the reducing sugar, or one or both of such reactants in solid form can be added to water to form an aqueous solution of the reactants. The metallic ions can be supplied from any soluble compound thereof, e.g. the chlorides, nitrates, sulfates, and acetates.

The sugars employed to form the chelates of the invention are of the class which are known as "reducing sugars." Preferably the mono and disaccharides are used. These include the trioses, tetroses, pentoses and hexoses. Among the monosaccharides, the hexoses, namely fructose, glucose, galactose and mannose have been found to produce best results, that is, chelates of greatest solubility and stability. Invert sugar, composed of a mixture of fructose and glucose, can be employed. Fructose or glucose can be employed in dextro or laevo rotatory forms, or as mixtures thereof. Fructose has been found most desirable. The pentoses such as ribose, ribulose, xylose, and arabinose, can also be employed, and also the trioses such as dihydroxy acetone, and the tetroses such as erythrose, but these materials are not preferred, because the chelates produced therefrom are less stable and require greater molecular ratios of the sugars to the metallic ion. Among the disaccharides we can, for example, employ the dihexoses such as lactose and maltose, and cellobiose. Mixtures of one or more of the above sugars can be utilized also. Sugars which are not of the reducing type, such as sucrose, are not suitable. However, the term "reducing sugars" employed herein is not employed to connote any known function of the sugar in forming the chelates of the invention, but is used essentially to define the class of materials which we have found suitable for forming the chelates of the invention.

We have found that in producing the soluble and stable chelates of the invention, the aqueous solution of the metallic ion can be employed conveniently in a range of concentration such that the final solution of the complex is about .01 to 1 molar in the metal, usually about 0.1 to 1 molar. The molar excess of the sugar employed with relation to the molar concentration of the metal in the final solution is preferably at least 2:1 and most desirably at least 4:1. Such molar ratio can be as high as 32:1, or higher. It is believed that the reason for this is the competition between (1) the OH ion for producing hydroxides with the metallic ion under aqueous alkaline conditions on the one hand, and (2) the sugar for producing complex chelates with the metallic ion under the same aqueous alkaline conditions on the other hand. We have found that to overcome the tendency of the metallic ions to form hydroxides, and to produce instead the chelates of the invention, the above noted large molar excess of sugar to metallic constituent must be employed. However, the invention is not to be taken as limited by the theory of the function of the reactants described above.

The higher the molar concentration of the metallic ion employed in producing the complex, however, the lower is the ratio of molar concentration of sugar to metallic ion employed; and the lower the molar concentration of the metallic ion employed in the aqueous solution thereof, the higher is the ratio of molar concentration of sugar to metallic ion utilized. For example, ferric ion may be employed as an aqueous solution of ferric chloride, and the iron concentration can range from .01 to 1 molar in the final solution. The molar concentration of reducing sugar, e.g. fructose, employed for admixture with the ferric chloride can range from a 2:1, and preferably 4:1 molar concentration of fructose to iron, to 9:1 or higher. At least about a 2:1 molar excess of fructose is employed where a 1 molar solution in iron is used, and at least a 9:1 molar excess of fructose is employed at the lower end of the range of concentration of the iron in solution, e.g. when using a .01 molar ferric chloride solution. Hence when the absolute concentration of the metallic constituent is low, a larger excess of the reducing sugar to the metallic constituent is employed, and vice versa.

The same general principles with respect to concentration of the reducing sugar and metallic ion apply to the other metallic ions and the other reducing sugars which may be employed in producing the invention complexes.

In the case of ferrous and cuprous elements, however, it has been found that for corresponding molar concentrations of metallic constituent, that is, ferrous or cuprous, a greater molar excess of sugar is employed than in the case of ferric or cupric. Thus, for a final solution 1 molar in ferrous or cuprous, the concentration of the reducing sugar should be in molar excess of 6:1 over ferrous or cuprous constituent, and at a molar concentration of 0.01 in ferrous or cuprous, a 32:1 molar ratio of sugar to such metal should be used. Ferrous and cuprous ions do not chelate as readily as ferric and cupric ions; that is, it requires a higher ratio of the concentration of sugar to ferrous or cuprous as compared to ferric or cupric.

With respect to manganese and cobalt, preferred chelates are produced employing these metals as the $Mn^{++}$ and $Co^{+++}$ ions, respectively.

That the solubility and stability of the chelates of the invention are both a function of the absolute concentration of the metallic constituent, e.g. iron, and the ratio of the molar concentration of the sugar to the metallic constituent, is indicated by the plot shown in the drawing. This is a plot of the molarity of fructose against the molarity of ferric ion employed for preparing the ferric fructose chelate. It will be noted that for any given concentration of ferric ion, concentrations of fructose to the right of curve A will generally produce a chelate which is soluble and stable throughout a pH range of 3 to 12. That is, a chelate which is soluble and stable over the above pH range is formed when the values of the molar concentration of ferric ion and fructose employed in preparing the chelate are in the region or area designated I in the drawing. This pH range of about 3 to 12 is the overall operable pH range for the complexes of chelates of the invention. At a pH of about 2 or below, the chelate formed in region I dissociates into the sugar and metallic ion, but reforms at pH above 2, due to the large excess of sugar present.

Referring again to the plot in the drawing, for a .01 molar solution of ferric ion, the use of a concentration of .09 molar or more of fructose produces a chelate generally soluble under all operable pH conditions, representing a molar excess of fructose over ferric ion of at least 9:1. For a 0.1 molar solution of ferric ion, the use of a concentration of 0.7 molar solution of fructose produces a soluble and stable chelate, representing a molar ratio of fructose to iron of 7:1; and for a 1.0 molar ferric ion solution, soluble and stable chelates are produced employing a solution having a molar concentration of about 3 or more in fructose, representing a fructose to ferric ion molar ratio of 3:1. However, in each of these instances, the use of a larger molar ratio of fructose to ferric ion is preferred over those minimum ratios above specified, in order to insure solubility of the chelate over the entire pH range of 3 to 12. For example, where the molar concentration of ferric ion is .01, a .16 molar concentration of fructose is preferably employed, representing a molar ratio of 16:1 of fructose to ferric ion, and for a 1 molar concentration of ferric ion, a 4 molar fructose solution is preferred.

Where, for a given concentration of ferric ion employed in producing the chelate, the concentration of the fructose is in region II to the left of curve B in the drawing, no soluble chelate can be formed regardless of the pH. Where the concentration of fructose is in region III between curves A and B, the chelate is soluble at pH of about 3 to about 5, and at a high pH above 9; that is, a major proportion, e.g. 80-90%, of the chelate formed may precipitate between pH 5 and 9, but redissolves at low pH between 3 and 5, or at high pH above 9. Thus, for a 0.1 molar concentration of ferric ion, the use of a solution of fructose of a molarity greater than .35 and less than 0.7 produces a chelate of the latter type.

In preferred practice of the invention, after the soluble metal compound has been reacted in aqueous solution with the reducing sugar in the required molar concentrations the solution is adjusted to a pH of about 8 by adding an alkaline material such as sodium or potassium hydroxide, or ammonium hydroxide. The chelates of the invention are slightly charged, but have an isoelectric pH, that is, a pH at which they are essentially uncharged. While the chelates of the invention need not be at their isoelectric pH for many uses, in some applications it may be desirable to buffer the chelate solution to the isoelectric pH of the solution. Such buffering agents may be a mixture of sodium acetate and acetic acid which is added to the chelate. Where, for other purposes, it is desired to maintain the chelate solution at a more alkaline pH, sodium bicarbonate can be employed as a buffer.

We have further found that the chelates employed in the invention process can be precipitated from aqueous solution, e.g. with alcohol, and the resulting water-soluble, isolated chelate will have a molar proportion of reducing sugar to metal different from the molar ratio of sugar to metallic constituent in the aqueous solution. We have found, for example in the case of ferric iron chelates, that by precipitation of the chelate in alcohol, the stable, water-soluble, isolated chelates of fructose and ferric iron may have a composition of about two molecules of fructose to one molecule of ferric iron, together with water of hydration. Where an alkaline material was employed in adjusting the pH of the aqueous solution of the chelate, as previously described, the solid, isolated chelate will also contain sodium, potassium or the ammonium radical.

While other ratios of sugar to iron can be obtained, in all instances the molecular ratio of sugar to iron in the chelate is at least 2:1. Thus, for example, the composition of the chelate can be 4 molecules of fructose to 1 molecule of ferric iron. The actual composition of the alcohol insoluble material is independent of the ratio of the initial sugar to the metal concentration employed in preparing the chelate solution from which the chelate was isolated, but is a function of the rate at which alkali, e.g. sodium hydroxide or other alkaline material, is added to alkalize the aqueous chelate solution.

It will be noted that the molar ratio of sugar to metallic constituent, e.g., iron, in these precipitated chelates is substantially lower than the molar ratio of sugar to iron in the corresponding aqueous solution from which the chelate is isolated.

The following are examples of preparation of chelates according to the invention:

*Example 1*

A 0.02 molar aqueous solution of ferric chloride is admixed with an equal volume of about a .32 molar aqueous solution of fructose at a temperature of 70° F., the resulting solution being about .01 molar in iron and .16 molar in fructose. The pH of the solution is adjusted from a pH of about 2 to 3 to a pH of about 8 by rapid addition of aqueous sodium hydroxide solution. The chelate formed remains soluble and stable at all pH values between about 3 and about 12.

*Example 2*

A 0.1 molar solution of ferrous chloride is mixed with an equal volume of a 3 molar solution of glucose, and the pH of the solution is adjusted to pH of about 8 by rapid addition of sodium hydroxide. The chelate formed remains soluble and stable at all pH values up to 12.

*Example 3*

A 0.02 molar solution of calcium chloride is mixed with an equal volume of about a .32 molar solution of fructose, the resulting solution being about .01 molar in calcium and .16 molar in fructose, and the pH of the solution is adjusted to 8 by addition of potassium hydroxide. The resulting chelate is soluble and stable over the pH range of 3 to 12.

*Example 4*

A .02 molar solution of titanium chloride is mixed with an equal volume of 0.4 molar solution of galactose and the resulting solution is adjusted to a pH of about 8 by addition of alkali. The resulting chelate is soluble and stable over the pH range of 3 to 12.

*Example 5*

A 0.2 molar cobaltic nitrate solution is mixed with an equal volume of 1.6 molar solution of fructose and the resulting solution is adjusted to pH of 8 by addition of alkali. The resulting solution of the chelate is soluble over a wide pH range.

*Example 6*

A 0.2 molar solution of nickel nitrate is mixed with an equal volume of 3.2 molar solution of glucose and the resulting solution adjusted to pH of about 8 by addition of alkali. The chelate so formed is soluble and stable over the pH range of 3 to 12.

*Example 7*

The procedure of Example 6 is repeated employing in one instance a 0.2 molar solution of manganese chloride and in the other instance a 0.2 molar solution of vanadium sulfate, each in place of the 0.2 molar solution of nickel nitrate. In both cases the chelate formed is soluble and stable over the 3 to 12 pH range.

*Example 8*

Ferric chloride and glucose are added to water to form a solution 1 molar in ferric chloride and 4 molar in glucose and the resulting solution adjusted to pH of about 8 by rapid addition of sodium hydroxide. The chelate is soluble and stable over a pH range of 3 to 12.

*Example 9*

The procedure of Example 1 is repeated, employing in separate instances a 0.4 molar solution of galactose and a 0.4 molar solution of mannose, in place of the .32 molar solution of fructose. In both instances the chelates formed are soluble and stable over the 3 to 12 pH range.

*Example 10*

A 0.2 molar solution of chromic chloride is mixed with about an equal volume of 1.6 molar solution of mannose, and the pH of the solution is adjusted to 8 by addition of ammonium hydroxide. The resulting chelate is soluble and stable over the pH range of 3 to 12.

*Example 11*

The procedure of Example 1 is repeated employing in place of the .32 molar fructose solution a 0.4 molar solution of invert sugar (0.2 molar in fructose and 0.2 molar in glucose). The chelate formed is soluble and stable over pH 3 to 12.

*Example 12*

A series of chelates are formed by adding the soluble metal compounds and reducing sugar, designated A and B, respectively, to water to form a solution having the respective molar concentrations of A and B shown in the table. In each case, the solution is adjusted to a pH of about 8 by rapid addition of sodium hydroxide solution. The chelate formed in each instance remains soluble and stable over a wide pH range of about 3 to 12.

| A | Molarity | B | Molarity |
|---|---|---|---|
| Calcium nitrate | 0.5 | Galactose | 2 |
| Magnesium chloride | 0.1 | Ribose | 1 |
| Strontium chloride | 0.1 | Lactose | 1 |
| Barium acetate | 0.1 | Lactose | 1 |
| Cupric nitrate | 0.01 | Maltose | 0.15 |
| Zinc sulfate | 0.01 | Maltose | 0.15 |
| Ferric chloride | 0.1 | Arabinose | 2.0 |
| Calcium chloride | 0.1 | Glucose | 1.0 |
| Chromium chloride | 0.01 | Fructose | 0.15 |
| Cupric nitrate | 0.1 | Fructose | 0.9 |
| Zinc sulfate | 0.1 | Glucose | 0.9 |

The following are examples of application of the invention chelates:

*Example 13*

An aqueous solution having about a 0.1 molar concentration of magnesium ions, is treated with fructose by adding the latter compound in an amount such that the solution is 0.9 molar in fructose and the pH adjusted to 8 or higher. The resulting complex sequesters practically all of the magnesium ions in solution, reducing the concentration of such ions to a very low level.

*Example 14*

To an alkaline solution of pH about 11 to 12, and containing precipitated ferric iron as hydroxide in a concentration of about 0.1 molar in ferric iron is added fructose in an amount rendering the solution about 2 molar in fructose. The precipitate gradually dissolves, producing a substantially clear solution having a very low ferric ion concentration.

*Example 15*

A solid composition is produced by precipitating from alcohol the chelate of Example 1 and drying the resulting precipitate. This material is administered to plants, preferably by foliar application, as an iron supplement for reducing yellowing of the foliage or poor growth due to iron deficiency.

From the foregoing, it is seen that we have developed a class of metal-reducing sugar complexes or chelates, and a process for producing them, said complexes being soluble and stable over a broad pH range and having a variety of useful applications.

While we have described particular embodiments of our invention for the purpose of illustration, it should be understood that various modifications and adaptations thereof may be made within the spirit of the invention as set forth in the appended claims.

We claim:

1. A complex consisting essentially of a reducing sugar and a metal selected from the group consisting of calcium, magnesium, strontium, barium, titanium, vanadium, chromium, manganese, iron, cobalt, nickel, copper and zinc, said complex being prepared by reacting in aqueous solution said sugar and metal ions selected from said group, the molar ratio of said sugar to said metal ions in the solution being at least 2:1, said complex being soluble and stable in aqueous media.

2. The complex of claim 1, wherein the sugar is selected from the group consisting of fructose, glucose, galactose and mannose, and wherein the sugar is reacted with a water soluble salt of the selected metal.

3. The complex of claim 1, wherein said metal is iron.

4. The complex of claim 1, wherein said metal is cobalt.

5. The complex of claim 1, wherein said metal is nickel.

6. The complex of claim 1, wherein said metal is calcium.

7. The complex of claim 1, wherein said metal is titanium.

8. The complex of claim 1, wherein said metal is manganese.

9. The complex of claim 1, wherein said metal is chromium.

10. The complex of claim 1, wherein said metal is copper.

11. The complex of claim 1, wherein said metal is strontium.

12. The complex of claim 1, wherein said metal is barium.

13. The complex of claim 1, wherein said metal is zinc.

14. A complex as defined in claim 1, comprising a chelate wherein said sugar is fructose, said metal is ferric iron and wherein the molar concentrations of the fructose and iron in the solution fall to the right of the curve marked "B" in the accompanying drawing.

15. A complex as defined in claim 1, comprising a chelate wherein said sugar is fructose, said metal is ferric iron and wherein the molar concentrations of the fructose and iron in the solution fall to the right of the curve marked "A" in the accompanying drawing.

References Cited in the file of this patent

UNITED STATES PATENTS

| | | |
|---|---|---|
| 2,440,729 | Signaigo | May 4, 1948 |
| 2,518,135 | Gaver | Aug. 8, 1950 |
| 2,572,923 | Gaver et al. | Oct. 30, 1951 |
| 2,871,236 | Bryant | Jan. 27, 1959 |

OTHER REFERENCES

Bourne et al.: "Chemistry and Industry," 1959, pp. 998–999.

Arni et al.: "Journal of Applied Chemistry," vol. 9, Part 3, March 1959, pp. 186–192.